US009286538B1

(12) United States Patent
Chen et al.

(10) Patent No.: US 9,286,538 B1
(45) Date of Patent: Mar. 15, 2016

(54) ADAPTIVE 3D TO 2D PROJECTION FOR DIFFERENT HEIGHT SLICES AND EXTRACTION OF ROBUST MORPHOLOGICAL FEATURES FOR 3D OBJECT RECOGNITION

(71) Applicant: HRL Laboratories, LLC, Malibu, CA (US)

(72) Inventors: Hai-Wen Chen, Aberdeen, MD (US); Yuri Owechko, Newbury Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 14/522,180

(22) Filed: Oct. 23, 2014

Related U.S. Application Data

(60) Provisional application No. 61/987,122, filed on May 1, 2014.

(51) Int. Cl.
G06K 9/46     (2006.01)
G06T 11/00    (2006.01)
G06T 7/00     (2006.01)

(52) U.S. Cl.
CPC ............ G06K 9/4604 (2013.01); G06T 7/0083 (2013.01); G06T 7/0091 (2013.01); G06T 11/003 (2013.01); G06T 2207/10028 (2013.01); G06T 2207/20036 (2013.01)

(58) Field of Classification Search
CPC ............ G06K 9/00201; G06K 9/4604; G06T 2207/10016; G06T 2207/10028; G06T 7/0028; G06T 7/0044; G06T 7/0083; G06T 7/0091; G06T 11/03
See application file for complete search history.

(56) References Cited

U.S. PATENT DOCUMENTS

| 6,100,893 | A * | 8/2000 | Ensz ...................... G06T 17/20 345/420 |
| 6,587,113 | B1* | 7/2003 | Baldwin .................. G06T 1/60 345/552 |
| 8,488,877 | B1* | 7/2013 | Owechko ........... G06K 9/00704 382/103 |
| 8,705,893 | B1* | 4/2014 | Zhang ................ G06K 9/00201 345/418 |
| 2003/0214502 | A1* | 11/2003 | Park ...................... G06T 15/205 345/420 |
| 2009/0122058 | A1* | 5/2009 | Tschesnok ............ G06T 7/0067 345/420 |
| 2010/0017407 | A1* | 1/2010 | Beniyama ......... G06F 17/30259 707/E17.016 |
| 2012/0041722 | A1* | 2/2012 | Quan .................... G06T 7/0071 703/1 |
| 2012/0121064 | A1* | 5/2012 | Bernard ................ G06T 11/008 378/37 |
| 2012/0261848 | A1* | 10/2012 | Haraszati ............... A61C 13/08 264/17 |
| 2015/0036870 | A1* | 2/2015 | Mundhenk ............ G06T 7/0028 382/100 |
| 2015/0063683 | A1* | 3/2015 | Fu ...................... G06K 9/00201 382/154 |
| 2015/0254499 | A1* | 9/2015 | Pang .................. G06K 9/00208 382/103 |

OTHER PUBLICATIONS

B. Douillard, D. Fox, F. Ramos, and H Durrant-Whyte Classification and semantic mapping of urban environments. In IJRR, 2011.

(Continued)

*Primary Examiner* — Jingge Wu
(74) *Attorney, Agent, or Firm* — Tope-McKay & Associates

(57) ABSTRACT

Described is a system for adaptive three-dimensional (3D) to two-dimensional (2D) projection for different height slices and extraction of morphological features. Initially, the system receives 3D point cloud data. Next, an image pixel number to point cloud number ratio is selected. Thereafter, an image row and image column are selected to identify desired height slices. The 3D point cloud is then accumulated on the desired height slices to generate a plurality of 2D height slices.

15 Claims, 12 Drawing Sheets

(56) References Cited

OTHER PUBLICATIONS

K. Lai and D. Fox. Object recognition in 3D point clouds using web data and domain adaptation, IJRR, 29(8), 2010.

X. Xiong and D. Huber. Using context to create semantic 3D models of indoor environments. In Proc. BMVC 2010.

W. L. Lu, K Okuma, and J. J. Little. A hybrid conditional random field for estimating the underlying ground surface from airborne lidar data. IEEE T-GRS, 47(8), 2009.

B. Douillard, J. Underwood, V. Vlaskine, A. Quadros, and S. Singh. A pipeiine for the segmentation and classification of 3D point clouds. In Proc. of the International Symposium on Experimental Robotics (ISER), 2010.

Point Cloud Library, http://www.pointclouds.org/documentation/tutorials/planar_segmentation.php taken on May 1, 2004.

Radu Bogdan Rusu, "Semantic, 3D object maps for everyday manipulation in human living environments", PhD thesis, 2009.

The Stanford 3D scanning repository, http://graphics.stanford.edu/data/3Dscanrep/, last modified Sep. 2, 2013, captured May 1, 2014.

The KITTI vision Benchmark Suite http://www.cvlibs.net/datasets/kitti/, captured May 1, 2014.

Alex Teichman, et al. "Towards 3D Object Recognition via classification of Arbitrary Object Tracks", 2011 IEEE International Conference on Robotics and Automation Shanghai International Conference Center, pp. 4034-4041, May 9-13, 2011, Shanghai, China.

Radu Bogdan Rusu and Steve Cousins, "3D is here: Point Cloud Library (PCL)", ICRA Communications, 2011.

A. Johnson, Spin-Images: A Representation for 3-D Surface Matching, doctoral dissertaton, The Robotics Institute, Carnegie Mellon Univ., 1997.

A. Johnson and M. Hebert, "Efficient Muitipie Model Recognition in Cluttered 3-D Scenes," Proc. IEEE Conf. Computer Vision and Pattern Recognition, pp. 671-678, 1998.

A. Johnson and M. Hebert, "Using Spin Images for Efficient Object Recognition in Cluttered 3D Scenes", IEEE Trans. Pattern Analysis and Machine Intelligence, vol. 21, pp. 433-449, 1999.

Dennis Braunreiter, Jeremy Furtek, Hai-Wen Chen, and Dennis Healy, "Overview of Implementation of DARPA GPU Program in SAIC," SPIE Defense & Security Symposium, Proceedings of Independent Component Analyses, Wavelets, Unsupervised Nano-Biomimetic Sensors and Neural Networks, VI, vol. 6979, pp. 0W01-0W09, Orlando, FL, Mar. 17-19, 2008.

W. Zhao, D. Nister, and S. Hsu, "Alignment of continuous video onto 3d point clouds", IEEE Transactions on Pattern Analysis and Machine Intelligence, 27(8):1305-1318. 2005.

M. Ding, K. Lyngbaek and A. Zakhor, "Automatic registration of aerial imagery with untextured 3D LiDAR models", Computer Vision and Pattern Recognition, pp. 1-8, 2008.

C. Fruh and A. Zakhor. "An automated method for large-scale, ground-based city model acquisition", International Journal of Computer Vision, 60(1):5-24, Oct. 2004.

L. Liu and I. Stamos, "Automatic 3D to 2D registration for the photorealistic rendering of urban scenes", Computer Vision and Pattern Recognition, pp. 137-143, Jun. 2005.

L. Liu, G. Yu, G. Wolberg and S. Zokai, "Muitiview Geometry for Texture Mapping 2D Images Onto 3D Range Data", IEEE Conference on Computer Vision and Pattern Recognition, vol. 2, pp. 2293-2300, 2006.

* cited by examiner

ADAPTIVE 3D TO 2D PROJECTION FOR DIFFERENT HEIGHT SLICES AND EXTRACTION OF ROBUST MORPHOLOGICAL FEATURES FOR 3D OBJECT RECOGNITION

CROSS-REFERENCE TO RELATED APPLICATIONS

This is a non-provisional application of U.S. Ser. No. 61/987,122, filed on May 1, 2014, entitled, "Adaptive 3D to 2D Projection for Different Height Slices and Extraction of Robust Morphological Features for 3D Object Recognition."

BACKGROUND OF THE INVENTION (1) Field of Invention

The present invention relates to a 3D object recognition system and, more particularly, to a system that adapts 3D to 2D projections to extract features for use in 3D object recognition.

(2) Description of Related Art

The present invention is directed to a three-dimensional (3D) object recognition system. Many existing 3D object recognition techniques are in early stages of development and are typically conducted directly on 3D point cloud data.

For example, Teichman et al. describe first finding a dominant line using the RANdom Sample Consensus (RANSAC) technique, with a 3D point cloud then projected into top, side, and front views to obtain orientation invariant features (See the List of Cited Literature References below, Literature Reference No. 1). A disadvantage with using RANSAC is that it uses a random search process and, thus, may not always find the dominant line of an object. Furthermore, for rounded objects such as the human body, there is no obvious dominant line which decreases the accuracy and efficiency of such a technique.

Other techniques of the prior art require high density point cloud data for processing. For example, the well-known spin-image technique (see Literature Reference Nos. 3-6) requires high density data to estimate surface norms. The spin-image surface matching technique starts by making a histogram-based image of the local surface coordinates (i.e., a "spin-image") and using standard image correlation techniques to identify good matches between points in the model and scene. A disadvantage with using the spin-image technique is that it requires high density data to perform surface matching. While operable in some applications, high density data is generally only obtained at close ranges. However, as can be appreciated, the ability to detect and recognize objects from longer ranges (where point clouds are sparse) is important in many 3D object recognition programs.

In other prior art (see Literature Reference Nos. 7-11), the 3D point cloud data is projected to a single 2D height image and a 2D intensity image for further processing. This 3D to 2D projection causes loss of intermediate level density and intensity information that is useful for 3D object segmentation at different heights. Thus, such techniques can be disadvantageous when attempting to identify objects at different heights.

Thus, a continuing need exists for a 3D object recognition system that improves upon the state of the art to generate multiple 2D density and intensity images to preserve most of the 3D intermediate level density and intensity information for object segmentation.

SUMMARY OF INVENTION

Described is a system for adaptive three-dimensional (3D) to two-dimensional (2D) projection for different height slices and extraction of morphological image features. The system includes one or more processors and a memory. The memory has instructions encoded thereon, such that upon execution of the instructions, the one or more processors perform operations of receiving the 3D point cloud data; selecting an image pixel number to point cloud number ratio; determining image row and image column numbers for desired height slices; accumulating the 3D point cloud on the desired height slices to generate a plurality of 2D height slices. The 2D height slices can then be used, for example, to extract features.

In yet another aspect, in accumulating the 3D point cloud on the desired height slices, the desired height slices are a number of horizontal slices that divide the 3D point cloud in a vertical direction, with the 3D point clouds being accumulated into different height slices depending on height (z-axis) positions, as follows:

z-span equals max-z minus min-z, where max z is a maximum measurement of the 3D point cloud in the z-axis and min z is a minimum measurement of the 3D point cloud in the z-axis, and z-interval equals z-span divided by height slice number, where z-interval is a thickness of each height slice.

In yet another aspect, in accumulating the 3D point cloud on the desired height slices, the 3D point cloud includes point cloud points, with the point cloud points being accumulated in each height slice such that if there is one or more than one points accumulated on a pixel, then a pixel value is one, otherwise the pixel value is zero.

Additionally and in another aspect, in accumulating the 3D point cloud on the desired height slices, the 3D point cloud includes point cloud points, with the point cloud points being accumulated in each height slice such that if there is one or more than one points accumulated on a pixel, then a pixel value equals to total accumulated point numbers, otherwise the pixel value is zero.

Further and yet in another aspect, in accumulating the 3D point cloud on the desired height slices, the 3D point cloud includes point cloud points, with the point cloud points being accumulated in each height slice such that if there is one or more than one points accumulated on a pixel, then a pixel value equals to a sum of an intensity from each of the accumulated points, otherwise the pixel value is zero.

Finally, the invention also includes a computer program product and computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
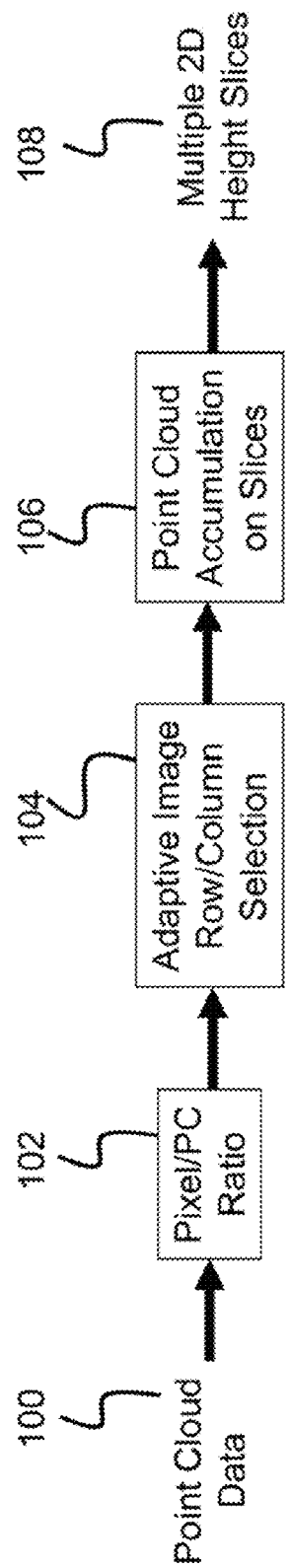
FIG. 1 is a flow diagram illustrating a process according to the principles of the present invention.

The present invention relates to a 3D object recognition system and, more particularly, to a system that adapts 3D to 2D projections to extract features for use in 3D object recognition. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of various principal aspects of the present invention is provided. Subsequently, an introduction provides the reader with a general understanding of the present invention. Next, details of the present invention are provided to give an understanding of the specific aspects. Finally, example applications and implementations are provided.

(1) List of Cited Literature References

The following references are cited throughout this application. For clarity and convenience, the references are listed herein as a central resource for the reader. The following references are hereby incorporated by reference as though fully included herein. The references are cited in the application by referring to the corresponding literature reference number, as follows:

1. Alex Teichman, et al., "Towards 3D Object Recognition via Classification of Arbitrary Object Tracks", 2011 *IEEE International Conference on Robotics and Automation Shanghai International Conference Center*, pp. 4034-4041, May 9-13, 2011, Shanghai, China
2. Radu Bogdan Rusu and Steve Cousins, "3D is here: Point Cloud Library (PCL)", *ICRA Communications*, 2011
3. A. Johnson, Spin-Images: A Representation for 3-D Surface Matching, doctoral dissertation, The Robotics Institute, Carnegie Mellon Univ., 1997.
4. A. Johnson and M. Hebert, "Efficient Multiple Model Recognition in Cluttered 3-D Scenes," *Proc. IEEE Conf. Computer Vision and Pattern Recognition*, pp. 671-678, 1998.
5. A. Johnson and M. Hebert, "Using Spin Images for Efficient Object Recognition in Cluttered 3D Scenes", *IEEE Trans. Pattern Analysis and Machine Intelligence*, vol. 21, pp. 433-449, 1999.
6. Dennis Braunreiter, Jeremy Furtek, Hai-Wen Chen, and Dennis Healy, "Overview of Implementation of DARPA GPU Program in SAIC," *SPIE Defense & Security Symposium, Proceedings of Independent Component Analyses, Wavelets, Unsupervised Nano-Biomimetic Sensors and Neural Networks*, VI, vol. 6979, pp. 0W01-0W09, Orlando, Fla., 17-19 March, 2008.
7. W. Zhao, D. Nister, and S. Hsu, "Alignment of continuous video onto 3d point clouds", *IEEE Transactions on Pattern Analysis and Machine Intelligence*, 27(8):1305-1318, 2005.
8. M. Ding, K. Lyngbaek and A. Zakhor, "Automatic registration of aerial imagery with untextured 3D LiDAR models", *Computer Vision and Pattern Recognition*, pp. 1-8, 2008.
9. C. Fruh and A. Zakhor. "An automated method for large-scale, ground-based city model acquisition", *International Journal of Computer Vision*, 60(1):5-24, October 2004.
10. L. Liu and I. Stamos. "Automatic 3D to 2D registration for the photorealistic rendering of urban scenes", *Computer Vision and Pattern Recognition*, pp. 137-143, June 2005.
11. L. Liu, G. Yu, G. Wolberg and S. Zokai, "Multiview Geometry for Texture Mapping 2D Images Onto 3D Range Data", *IEEE Conference on Computer Vision and Pattern Recognition*, vol. 2, pp. 2293-2300, 2006.
12. R. C. Gonzalez, et al. *Digital Image Processing Using MATLAB*, Pearson Pretice Hall, 2004.
13. Haralick and Shapiro, *Computer and Robot Vision*, vols. 1 & 2, Addison-Wesley, Reading, Mass., 1992.

(2) Principal Aspects

The present invention has three "principal" aspects. The first is a system that adapts three-dimensional (3D) point cloud data into two-dimensional (2D) projections to extract features for use in 3D object recognition. The system is typically in the form of a computer system operating software or in the form of a "hard-coded" instruction set. The system may include a sensor to obtain the 3D point cloud data and may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

(3) Introduction

The present invention relates to a three-dimensional (3D) object recognition system and, more particularly, to a system that adapts 3D point cloud data into two-dimensional (2D) projections to extract features for use in 3D object recognition. Although Light Detection and Ranging (LIDAR) point cloud data contains useful 3D information, it is difficult to extract robust features for 3D object recognition, multiple frame registration, as well as sensor fusion between 2D sensors and 3D LIDAR sensors. The main reason that the prior art has difficulty with such tasks is that the point cloud data is irregularly scattered in the 3D space, as opposed to the regularly/uniformly sampled 2D images.

The present invention improves upon the prior art by providing a system that allows for adaptive 3D to 2D projection of objects using different height slices and, in doing so, allows for the extraction of robust morphological features for 3D object recognition. Thus, the system is operable for projecting the irregularly spaced 3D point cloud into multiple 2D image slices at various heights. If the slices are sufficiently detailed (e.g., such as computerized tomography (CT)/magnetic resonance imaging (MRI) scanned slices), the 2D slices will contain all of the 3D shape information of the object. The 2D image slices are regularly spaced images. As such, traditional image processing techniques can be applied to process the image slices. Non-limiting examples of such imaging processing techniques include spatial filtering, fast Fourier transform (FFT), view-invariant feature extraction, robust Harris corner, scale-invariant feature transform (SIFT), Speeded Up Robust Features (SURF), and morphological feature extraction. Furthermore, the 2D image (x, y) resolution is adaptively selected depending on the 3D point cloud density to avoid forming ill-conditioned images when the point cloud data is very sparse.

Thus, state-of-the-art 2D image processing techniques can be used for improving tasks in 3D object recognition. Orientation invariant features can be easily extracted from the 2D image slices (such as moment invariants and morphological features). As such, detailed 3D object shape information is obtained by differentiating features between slices, which will allows for improving 3D object recognition performance.

(4) Specific Aspects of the Invention

As shown in FIG. 1, the present invention is directed to a system that is operable for projecting the irregularly spaced 3D point cloud 100 into multiple 2D image slices 108 at various heights. As understood by those skilled in the art, a point cloud is a set of data points in some coordinate system. In a 3D coordinate system, these points are defined by X, Y, and Z coordinates. Thus, the 3D point cloud 100 includes data points in a 3D coordinate system (with the data points being 3D point cloud points).

The present invention can be generally described as having three sub-processes, as follows: 1) Selecting an Image Pixel Number to Point Cloud Number Ratio (Pixel/PC ratio) 102; 2) Adaptive Image Row/Column Selection 104; and 3) Point Cloud Accumulation (mapping) on Height Slices 106. These processes are described in further detail below.

(4.1) Selecting an Image Pixel Number to Point Cloud Number Ratio (Pixel/PC Ratio)

In the first sub-process, the image size (total pixel numbers (i.e., Pixel Number)) is determined by setting a Pixel/PC ratio to a desired value and then multiplying the point cloud number by the P/P ratio, as follows:

$$\text{Pixel Number} = \text{Pixel/PC ratio} * \text{Point Cloud Number}.$$

The point cloud number is the number of 3D point cloud points contained within an image slice. The slice can be either horizontally, vertically, or curved in height; however, desirably, the slice is in the horizontal plane. As a non-limiting example, the image size is determined by setting the Pixel/PC ratio with a range of 0.5-1.5 and multiplying the Pixel/PC ratio with a point cloud number. The sum of the pixel numbers for all slices is approximately equal to the total number of points in the 3D point cloud 100, to within scaling by the Pixel/PC ratio for each slice.

(4.2) Adaptive Image Row/Column Selection

In the second sub-process, the x-axis span (i.e., x-span) and y-axis span (i.e., y-span) of the point cloud need to be determined. For example, the x-span and y-span of the point cloud can be calculated in meters (or any other suitable measurement). Then, based on the ratio of the x-span and y-span as well as the Pixel Number, the image row (Image Row Number) and column numbers (Image Column Number) can be determined using the following equations:

$$x\text{-span} = \max x - \min x,$$

where max x is the maximum measurement of the point cloud in the x-axis and min x is the minimum measurement of the point cloud in the x-axis.

$$y\text{-span} = \max y - \min y,$$

where max y is the maximum measurement of the point cloud in the y-axis and min y is the minimum measurement of the point cloud in the y-axis.

$$\text{rate span} = x\text{-span}/y\text{-span};$$

$$\text{Image Column Number} = \text{square root of (Pixel Number} \times \text{rate span)};$$

$$x\text{-interval} = x\text{-span}/\text{Image Column Number},$$

where x-interval is the image sampling interval along the x-axis. In general, the sampling interval along the y-axis is selected to be the same as in x-axis:

$$y\text{-interval} = x\text{-interval};$$

Finally, Image Row Number = $y$-span/$y$-interval.

For clarity, the Image Row Number is the number of rows in an image slice and the Image Column Number is the number of columns in an image slice.

(4.3) Point Cloud Accumulation on Height Slices

The third sub-process is Point Cloud Accumulation on Height Slices. In the third sub-process, the total height slice number is selected (e.g., in a range of 3-15, depending on the task on hand). The height slice number is the number of horizontal height slices that divide the input point cloud in the vertical direction.

Then, the point clouds are accumulated into different height slices depending on the points' height (z-axis) positions, as follows:

$$z\text{-span} = \max\text{-}z - \min\text{-}z,$$

where max z is the maximum measurement of the point cloud in the z-axis and min z is the minimum measurement of the point cloud in the z-axis, and $$z\text{-interval} = z\text{-span/height slice number},$$

where z-interval is the thickness of each height slice.

While there may be many ways to treat multiple point cloud points for each pixel in each height slice image, provided below are three non-limiting examples according to the principles of the present invention. Thus, the three different ways to count the point cloud points in each height slice image are as follows:
1. If there is one or more than one point cloud points in a pixel, then the pixel value is one, otherwise the pixel value is zero;
2. If there is one or more than one point cloud points accumulated on a pixel, then the pixel value equals the total accumulated point numbers, otherwise the pixel value is zero; and
3. If there is one or more than one point cloud points accumulated on a pixel, then the pixel value equals to the sum of the intensity from each of the accumulated points, otherwise the pixel value is zero.

Accordingly, from the above three accumulation techniques, three different 2D height slice images are obtained, respectively, as follows:
1. Geometric Span Slice Images: Geometric span slice images are 2D binary images (containing values 0 or 1). These images contain the 3D object shape and geometric span information about the part of the 3D objects contained within each horizontal height slice. Robust morphological features can be extracted from these images for 3D object/target recognition;
2. LIDAR Density Images: LIDAR density images contain both the geometric span 3D sampling density information about the objects. The additional density information is helpful to further improve 3D object/target recognition performance; and
3. Intensity Images: Intensity images contain both the geometric span and light reflecting intensity information about the object horizontal height slices. The additional intensity information is helpful to further improve 3D object/target recognition performance.

Finally, it should be understood that the 3D to 2D projection design is flexible. All the slices can have the same x (column) and y (row) dimensions for easier computations of differentiating features between slices (e.g., centroid shifts, and boundary shifts, etc.). Alternatively, the x and y dimensions adaptively vary with the point cloud density in each slice so that the 3D object recognition is more robust to clutter noise. Similarly, the slice number can be pre-selected so that the slice thickness may change depending on the object maximum height (max-z). This scheme works for the case where different object classes have similar heights (e.g., car, pedestrian, and bicyclist, etc.). As another alternative, the slice thickness can be fixed so that the slice number will adaptively change with the object maximum heights. This scheme works for the case in which different object classes have different heights (e.g., pedestrian, car, tree, and building, etc.).

As understood by those skilled in the art, the present invention allows for 3D image data to be converted into 2D image slices. After obtaining the 2D image slices, many current state-of-the-art feature extraction techniques for 2D images can be equally applied to the 2D image slices for object recognition purposes (See Literature Reference No. 12). Non-limiting examples of extractable features include object height (z-span), length (x-span), width (y-span), morphological regional descriptors, moment invariants, Fourier descriptors, principal component analysis (PCA), chain codes, boundary matching, boundary signatures, patch shape skeletons, Harris/Tomaci corners, SIFT, and SURF, etc.

The extracted features can then be used by any suitable object recognition engine to identify the 3D object. Non-limiting examples of suitable object recognition engines include support vector machines and decision trees.

(5) Example Applications and Implementations

Some preliminary experiments were performed to demonstrate the efficacy of the present invention with respect to some specific example applications.

Figure 2:
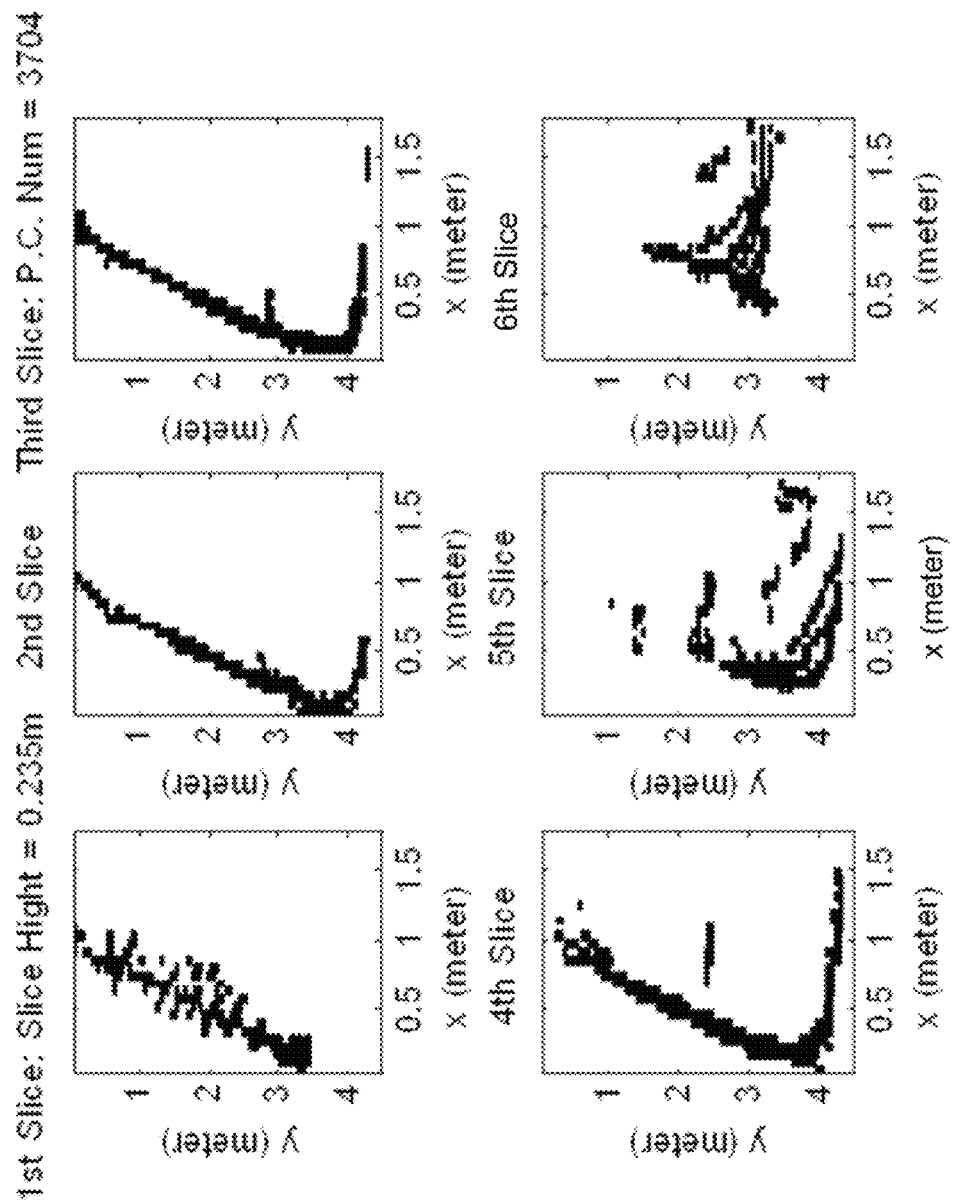
FIG. 2 is an illustration depicting a projection of three-dimensional (3D) point cloud data for a car onto six two-dimensional (2D) height image slices.

The first experiment was directed to a 3D object classification case with three object classes: car, pedestrian, and bicyclist. As discussed above, the three object classes have similar heights. In this example, the slice number was pre-selected at six. For illustrative purposes, FIG. 2 shows a projection of the 3D point cloud data (of the car) onto six 2D image slices at different heights. As shown, the 2D images slices are geometric span binary images. The P/P rate is 0.6.

Figure 3:
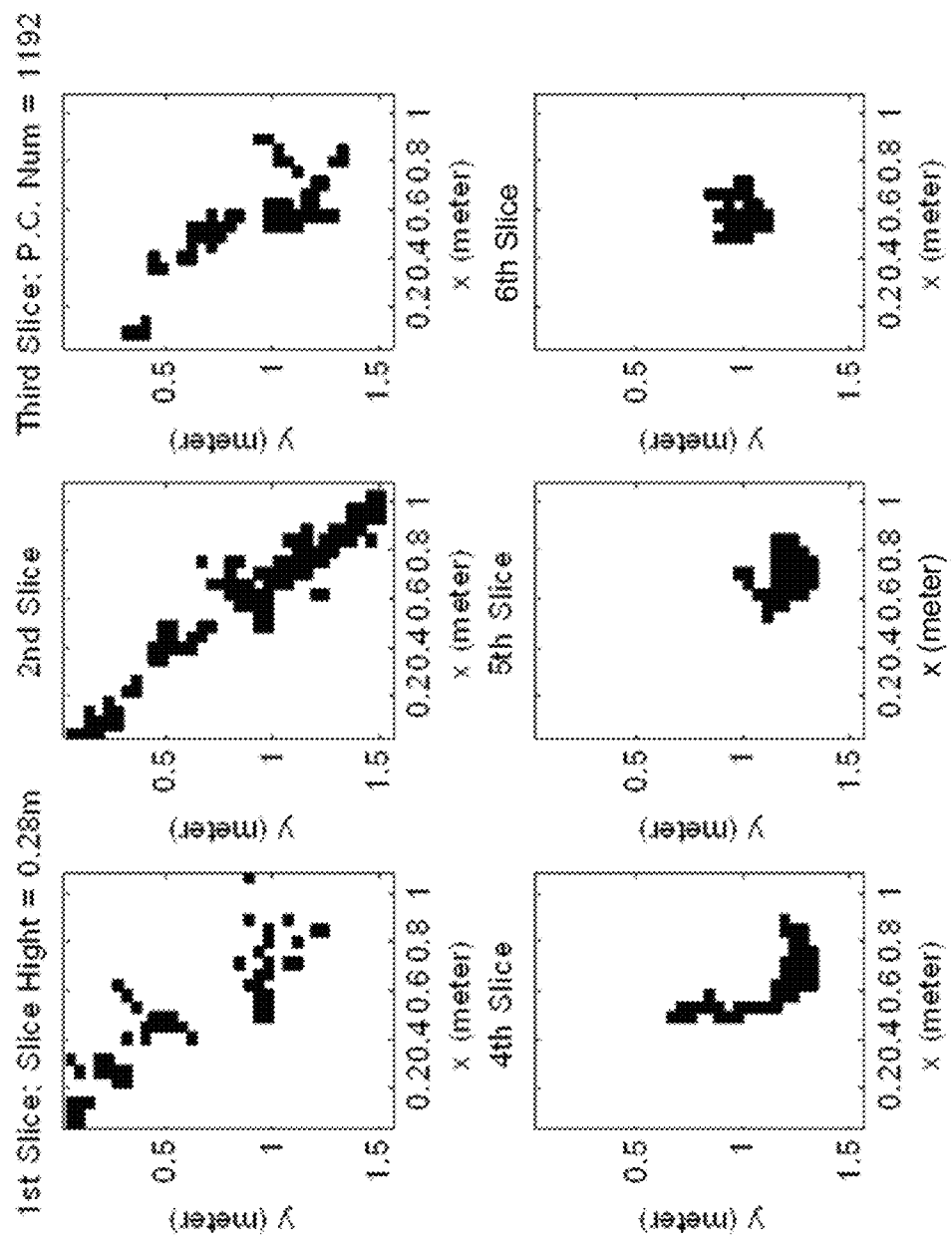
FIG. 3 is an illustration depicting a projection of 3D point cloud data for a bicyclist onto six two-dimensional (2D) height image slices.
Figure 4:
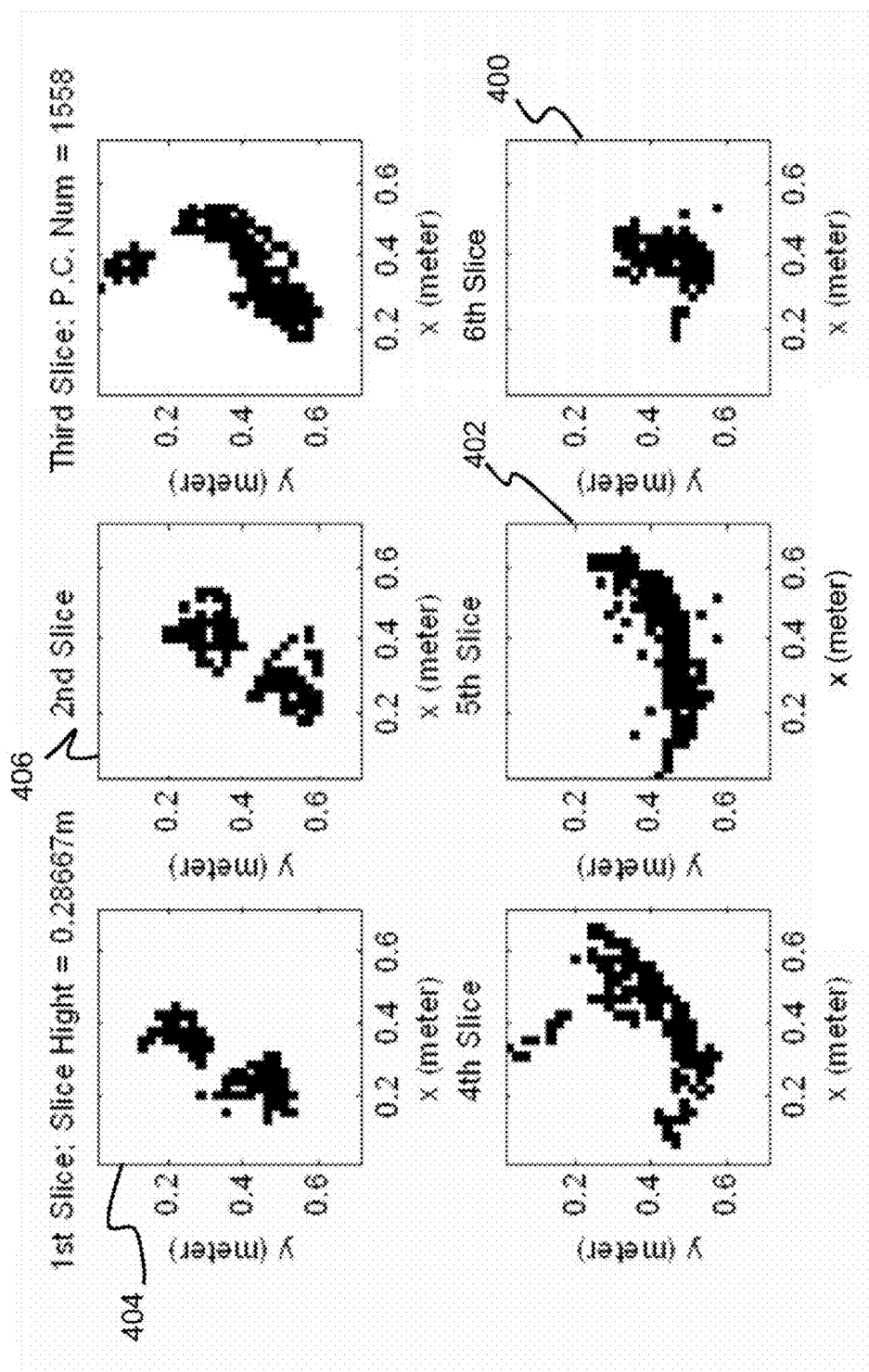
FIG. 4 is an illustration depicting a projection of 3D point cloud data for a pedestrian onto six 2D height image slices.

For further illustration, FIG. 3 shows a projection of the 3D point cloud data (of the bicyclist) onto six 2D image slices at different heights, while FIG. 4 shows a projection of the 3D point cloud data (of the pedestrian) onto six 2D image slices at different heights.

It is of note that in FIG. 4, the 6th slice 400 is the top slice. In this example, the 6th slice 400 contains the human head geometric span in the (x, y) plane, the 5th slice 402 contains the human shoulder geometric span, and the 1st 404 and 2nd slices 406 show the cross-sections of the two legs. The slices are similar in appearance MRI scan slices of a human body. These results confirm that the 2D slices do contain the 3D object shape information that is useful for 3D object recognition.

Several basic morphological features can be extracted from the pixel patches in each slice (See Literature Reference No. 13 for a discussion of moments of an ellipse). Non-limiting examples of such features are as follows:
1. Pixel number: the actual number of pixels in the slice;
2. Bounding box: the smallest rectangle containing the pixel region in the slice;
3. Centroid: the center of mass of the pixel region;
4. Major-Axis-Length: a scalar value specifying the length (in pixels) of the major axis of the ellipse that has the same normalized second central moments as the pixel region;
5. Minor-Axis-Length: a scalar value specifying the length (in pixels) of the minor axis of the ellipse that has the same normalized second central moments as the pixel region;
6. Orientation: the angle (in degrees ranging from −90 to 90 degrees) between the x-axis and the major axis of the ellipse that has the same second-moments as the pixel region;

7. Eccentricity: specifies the eccentricity of the ellipse that has the same second-moments as the pixel region; and
8. Extent: specifies the ratio of pixels in the region to pixels in the total bounding box.

Point cloud density invariant properties can be achieved by converting pixel numbers to size and length units (e.g., metric units). Thus, from the basic morphological features provided above, seven features can be obtained that are size, position, and orientation invariant: Pixel-Area, Bounding Area, Major-Axis-Length, Minor-Axis-Length, Length-to-width ratio, Eccentricity, and Extent. The Length-to-width ratio is equal to the Major-Axis-Length divided by the Minor-Axis-Length. The seven features can be obtained from the whole pixel area in a slice that is treated as a single patch, or from several smaller sub-patches based on the morphological connectivity rules.

Additional rotation and position invariant features are obtained by calculating differences of orientations and centroid positions between slices. For example, a total of 59 morphological features are extracted from the six height slice images: f[0]~f[58] as shown below:

f[0]~f[4]: Centroid difference between slices;
f[5]~f[9]: Orientation difference between slices;
f[10]~f[16]: the seven morphological features for the largest sub-patch in the top slice (the $6^{th}$ slice);
f[17]~f[23]: the seven morphological features for the top slice (the 6th slice);
f[24]~f[30]: the seven morphological features for the 5th slice;
f[31]~f[37]: the seven morphological features for the 4th slice;
f[38]~f[44]: the seven morphological features for the 3rd slice;
f[45]~f[51]: the seven morphological features for the 2nd slice;
f[52]~f[58]: the seven morphological features for the 1st slice (the bottom slice).

Figure 5:
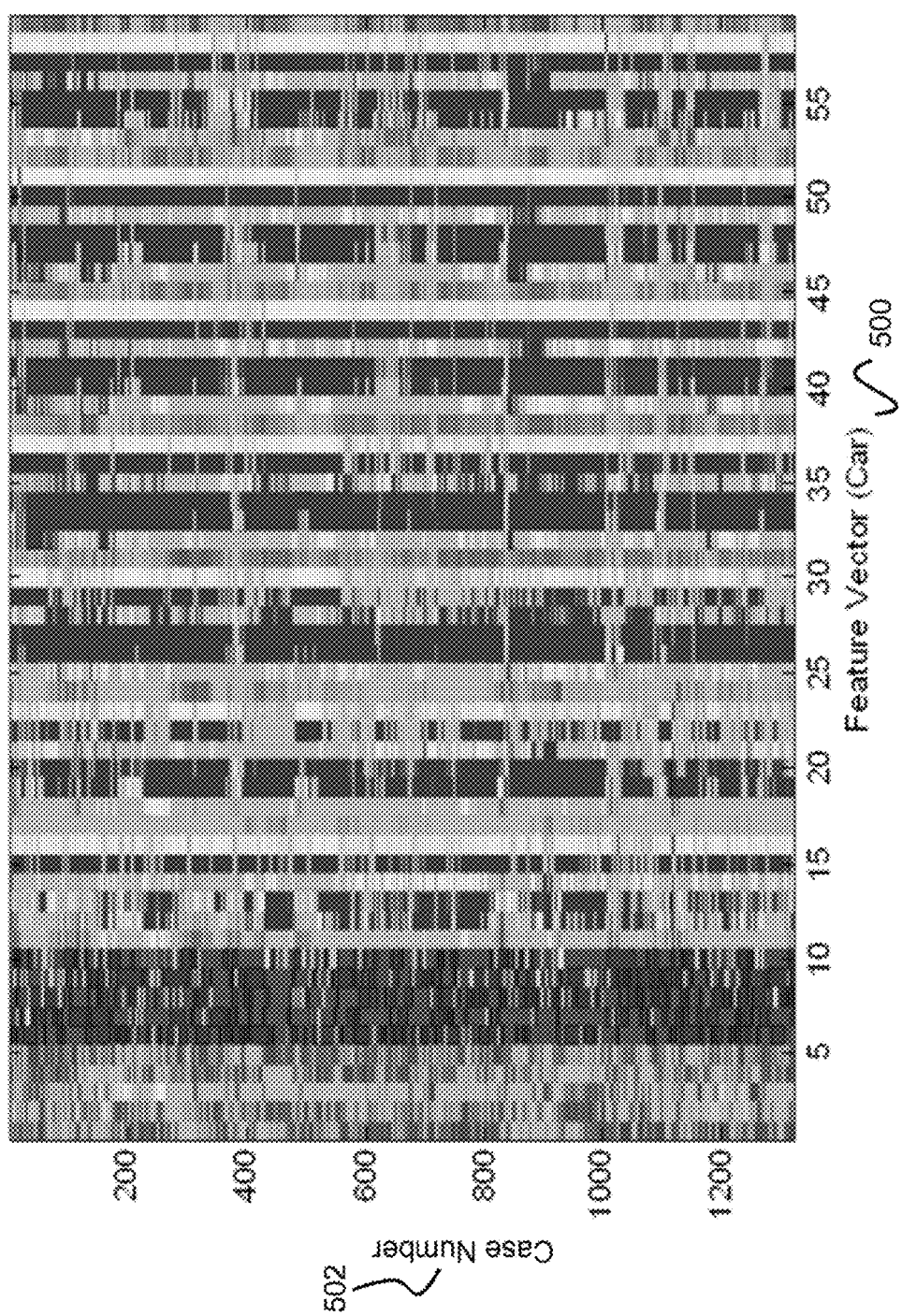
FIG. 5 is an illustration depicting an extracted car morphological feature vector (59 features) from the six 2D height image slices.
Figure 6:
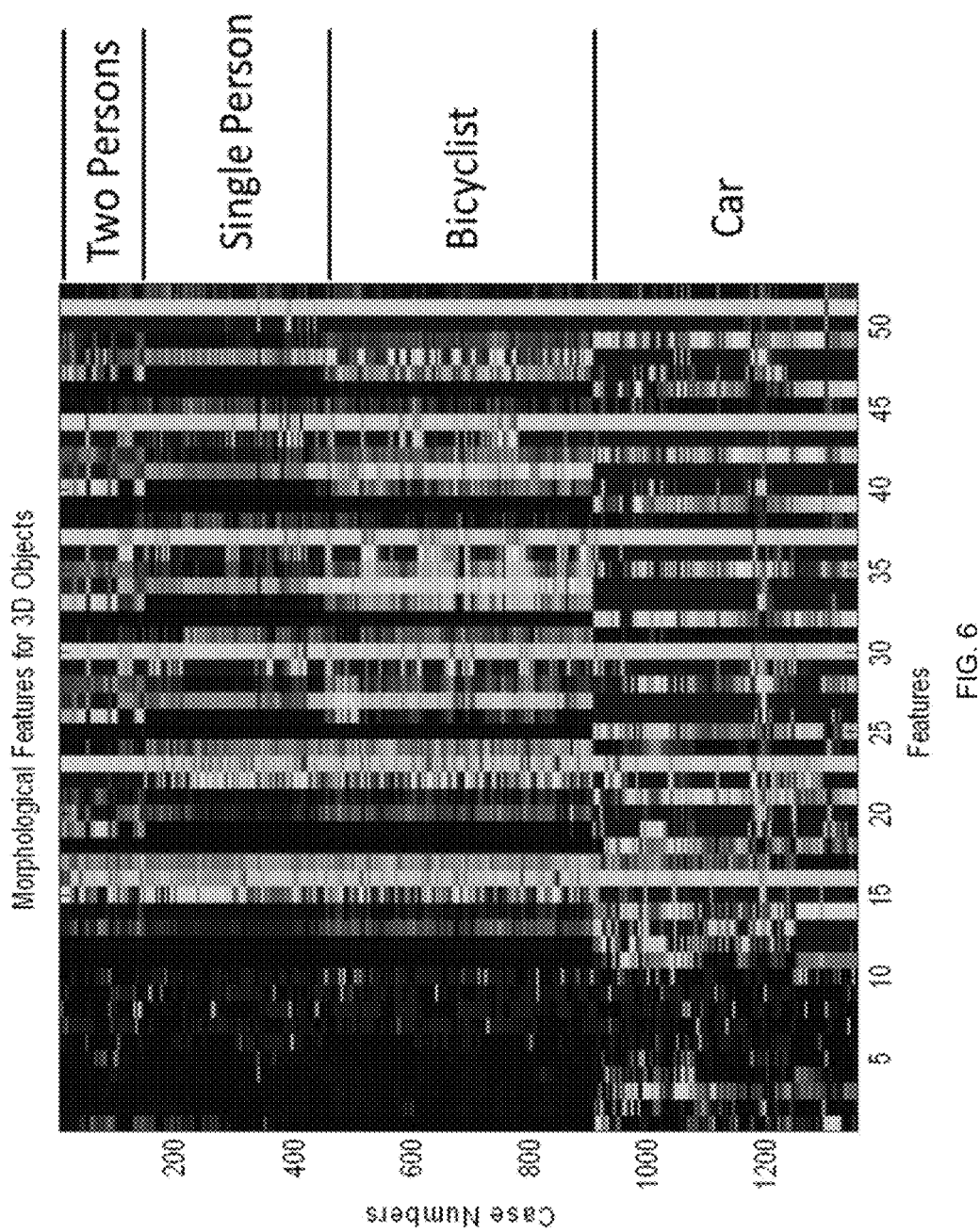
FIG. 6 is an illustration depicting extracted feature vectors for a car, bicyclist, and a pedestrian.

For further understanding, FIG. 5 is an illustration depicting the 59 extracted morphological features for 1350 different cars. The x-axis 500 represents the feature vectors while the y-axis 502 represents the different cars (or case number). FIG. 6 provides further illustration of feature vector extraction. More specifically, FIG. 6 is a chart illustrating extracted feature vectors for 450 cars, 450 bicyclists, and 450 pedestrians. Each row is a feature vector for one object. Among the pedestrian group, about 100 cases are two closely spaced persons. The results in FIG. 6 indicate that some features may even provide discrimination power between the single-person vs. closely-spaced two-persons within the pedestrian class, for example Features 33 and 40. Note that certain features or subsets of features have different ranges of values for different object types. For example, Feature 39 is high for cars but low for the other objects. The extracted features are then used by any suitable object recognition engine to identify the object.

Figure 7:
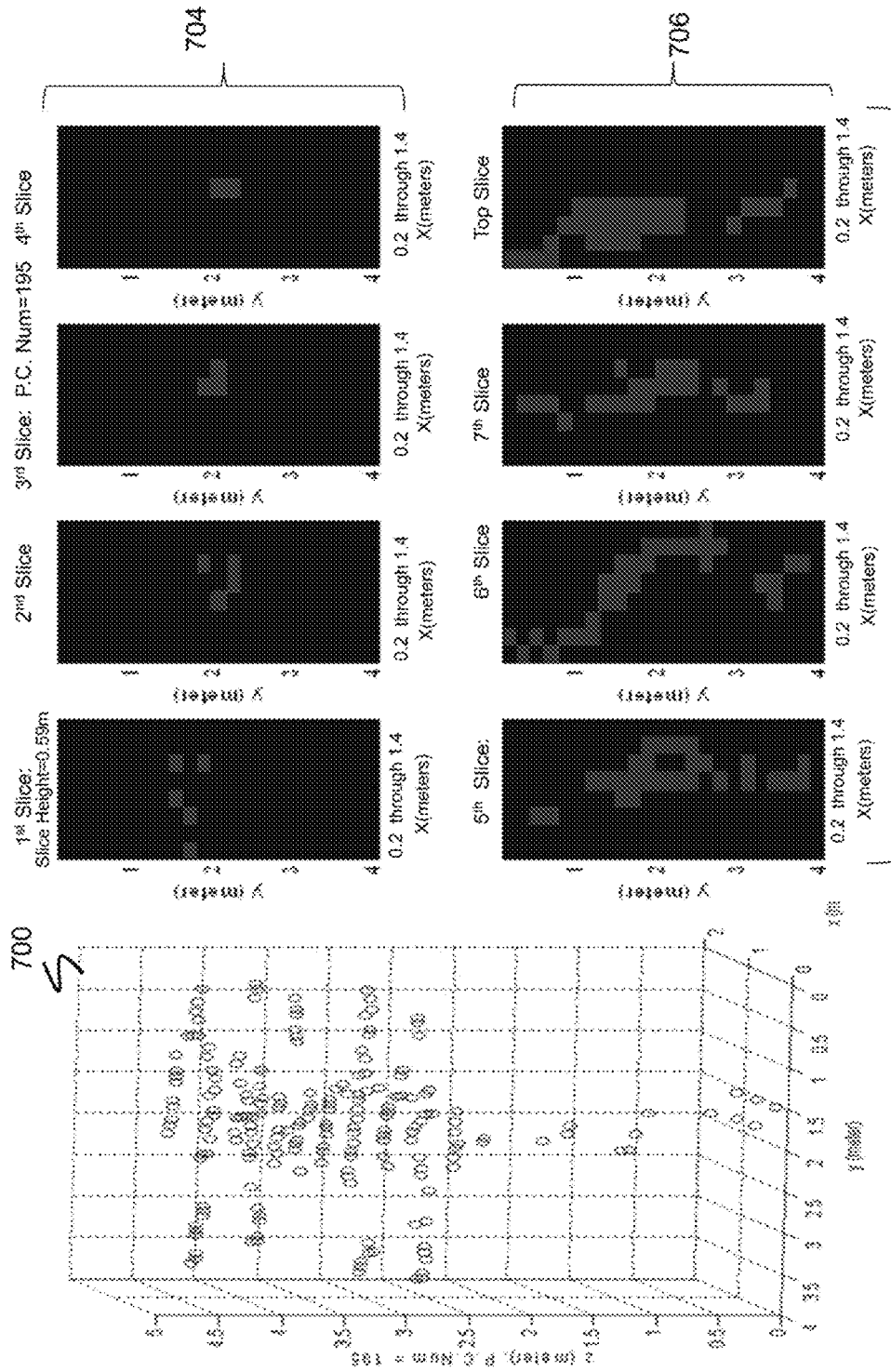
FIG. 7 is an illustration of a projection of a 3D tree onto eight 2D height image slices.

To further verify performance of the present invention, a series of tests were performed. For example, promising results were demonstrated for object classification of the car, pedestrian, and bicyclist classes, all of which have similar heights (<2 meters). For comparison purposes, a set of projected 2D slices for a tree are shown in FIG. 7. Specifically, FIG. 7 illustrates a point cloud 700 projection on eight 2D height image slices 702. The tree in this example is as tall as five meters—much taller than the other three classes (i.e., car, bicyclist, and pedestrian). Therefore, the object height (height of the slice stack) along the y-axis can serve as a good feature for distinguishing tall objects from short ones. The different cross-section area sizes in the higher slices 704 vs. the lower slices 706 for a tree (as shown in FIG. 7), should make it easier to classify the tree from other tall objects. For example, one would expect to get similar small cross-section areas across all the slices for a power-line pole.

The above results illustrate applications of the binary geometric span slice images. Provided below are example applications of LIDAR density and intensity height slice images. It should be noted that reflected light intensity in LIDAR data may not be reliable for classifying objects at different ranges/distances. Therefore, in this example, intensity was not used in the feature vector for object classification. Nevertheless, the intensity (or point density) from an object during a short time period (e.g., between two sampled time frames) may not change much, and thus may be used as a good feature for moving object tracking as well as for 3D scene registration.

Figure 8:
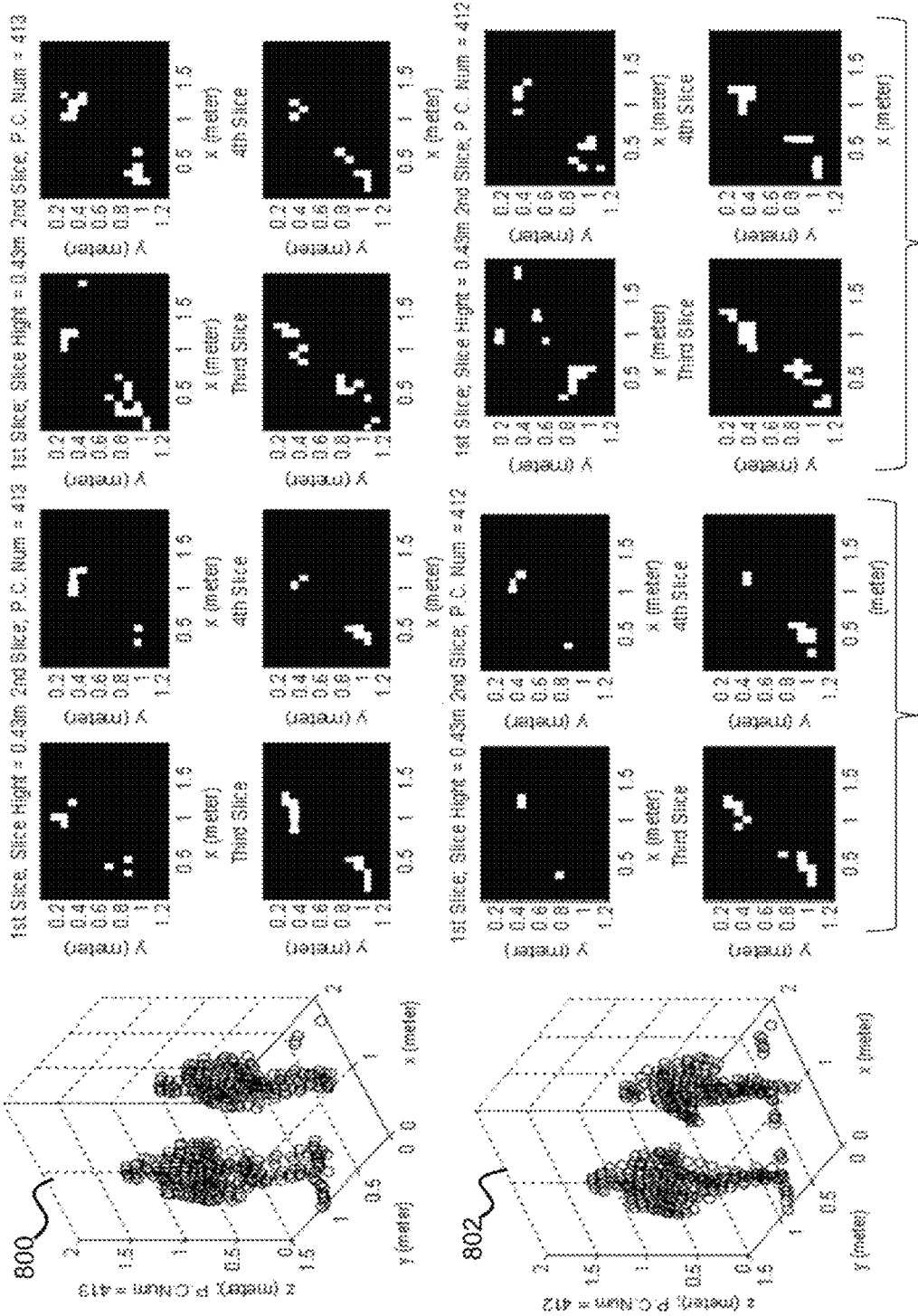
FIG. 8 is an illustration depicting two cues derived from two consecutive frames.

An example with two-pedestrians is shown in FIG. 8, which illustrates two cues from two consecutive frames sampled at 0.1 sec intervals (10 fps), resulting in a first point cloud 800 and second point cloud 802, respectively, and the corresponding image slices. The colored height slice images 804 are density images and the black/white height slice images 806 are intensity images. It is shown that the reflected light intensity and morphological shapes do not change much between two sampling time frames (at 10 fps). Therefore, it is desirable to use these 2D features as well as other current state-of-the-art 2D object matching features (SIFT, SURF, Harris corners, etc.) for cross time-frame object/scene matching, tracking, as well as multiple frame registration.

Figure 9:
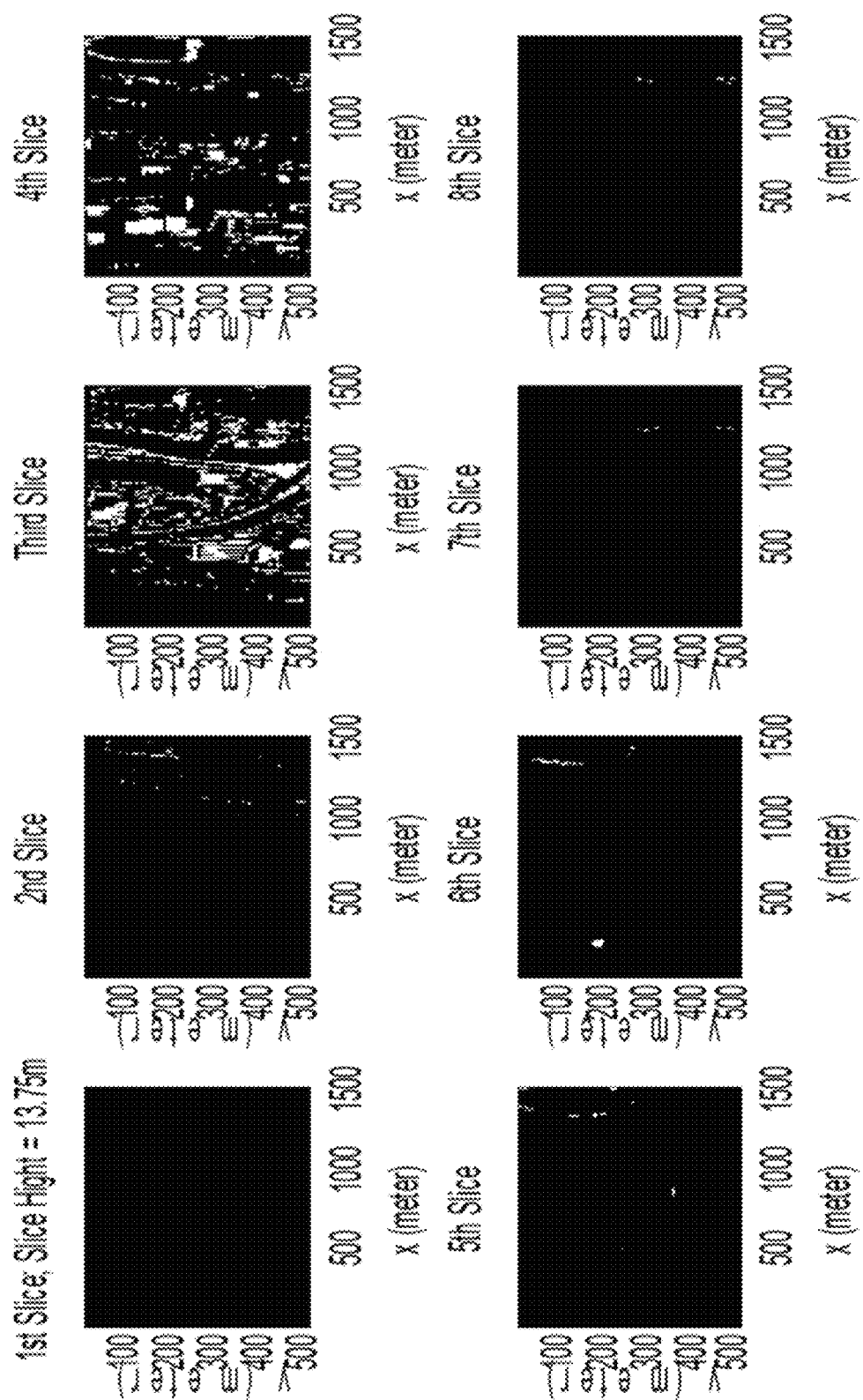
FIG. 9 is an illustration of LIDAR density height slice images over the Ohio State University campus.
Figure 10:
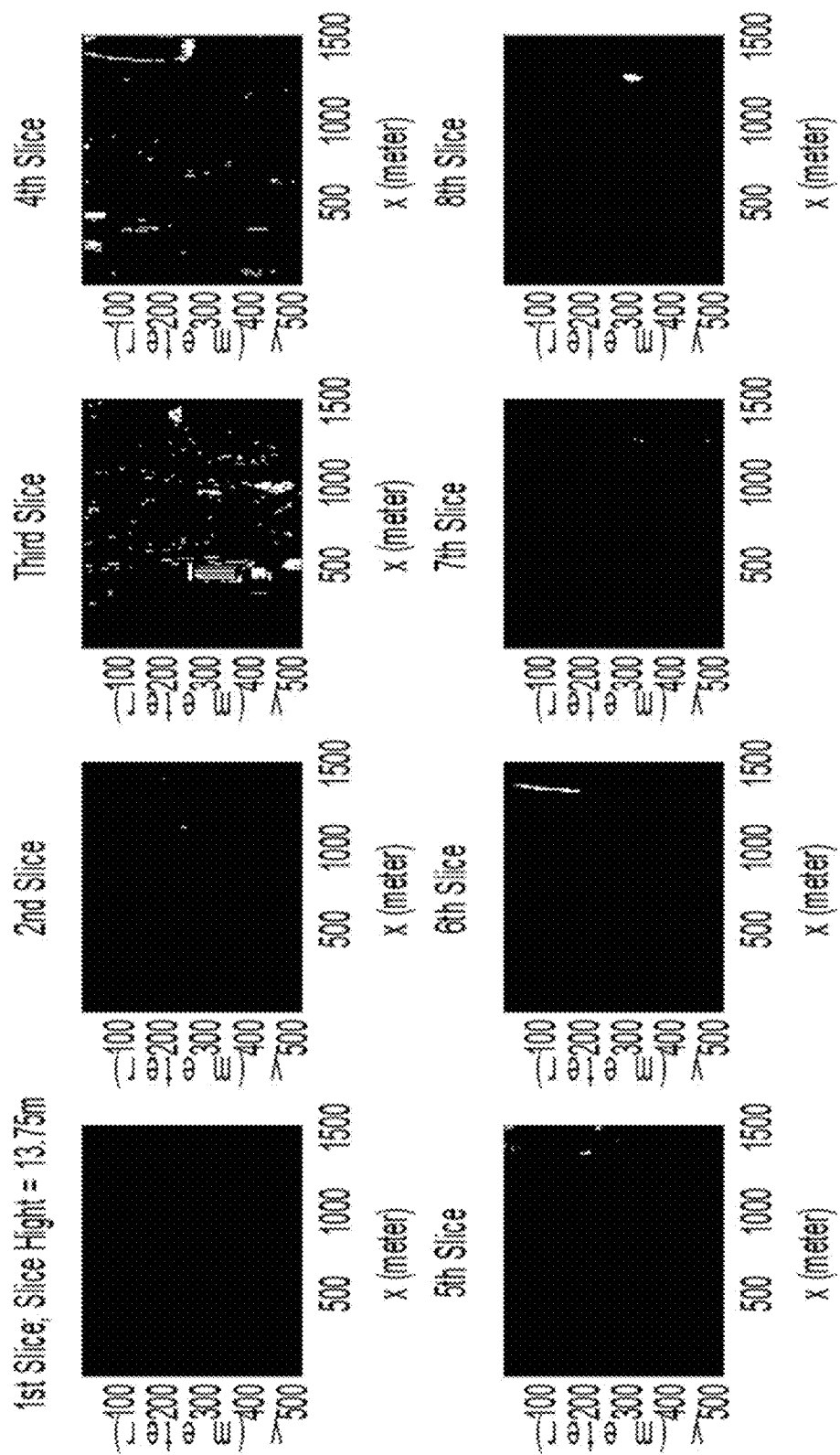
FIG. 10 is an illustration of LIDAR intensity height slice images over the Ohio State University campus.

As another example, FIGS. 9 and 10 show LIDAR density and intensity height slice images, respectively, over the Ohio State University campus. It is seen that the generated multiple 2D density and intensity images at different heights preserve most of the 3D intermediate level density and intensity information for object segmentation. In other words, the image slices show the information that would be expected if one takes horizontal slides of the 3D point cloud at different heights. Thus, given the preservation of the density and intensity information, it should be understood that the method according to the principles of the present invention can easily segment out building tops at different heights, which allows for one to localize building corners for sensor fusion between 2D EO/IR/SAR sensors and 3D LIDAR sensors.

Figure 11:
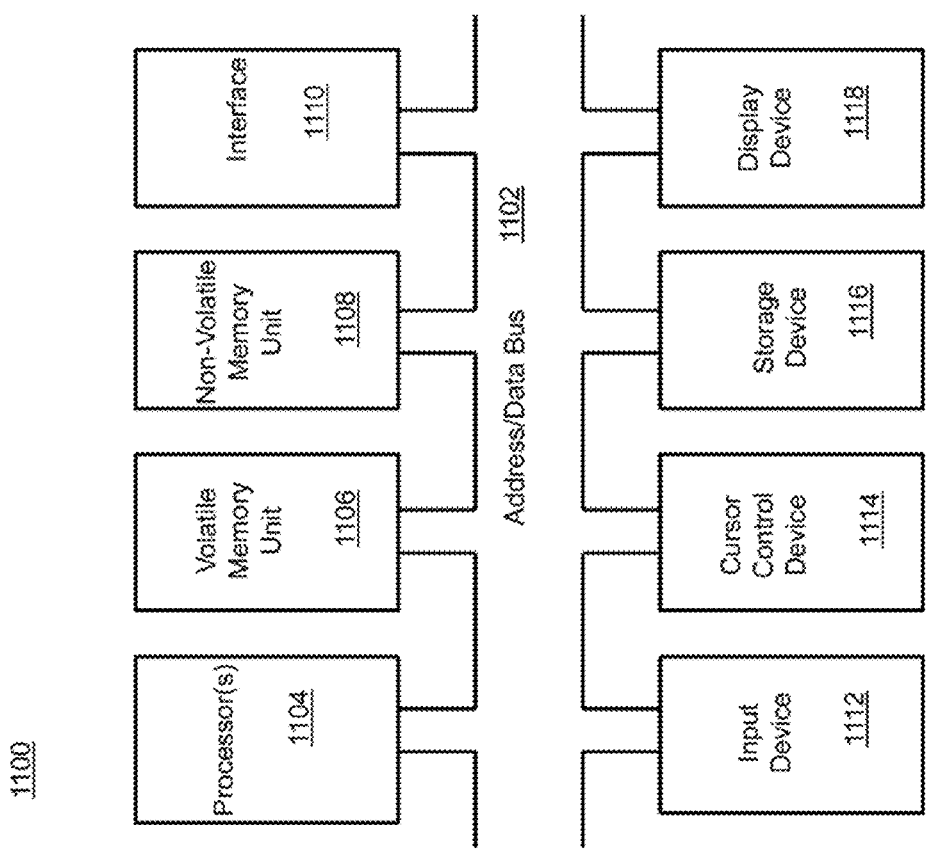
FIG. 11 is a block diagram depicting the components of a system according to the principles of the present invention.

A block diagram depicting an example of a system (i.e., computer system 1100) implementing the present invention is provided in FIG. 11. The computer system 1100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 1100. When executed, the instructions cause the computer system 1100 to perform specific actions and exhibit specific behavior, such as described herein.

The computer system 1100 may include an address/data bus 1102 that is configured to communicate information. Additionally, one or more data processing units, such as a processor 1104 (or processors), are coupled with the address/data bus 1102. The processor 1104 is configured to process information and instructions. In an aspect, the processor 1104 is a microprocessor. Alternatively, the processor 1104 may be a different type of processor such as a parallel processor, or a field programmable gate array.

The computer system 1100 is configured to utilize one or more data storage units. The computer system 1100 may include a volatile memory unit 1106 (e.g., random access memory ("RAM"), static RAM, dynamic RAM, etc.) coupled with the address/data bus 1102, wherein a volatile memory unit 1106 is configured to store information and instructions for the processor 1104. The computer system 1100 further may include a non-volatile memory unit 1108 (e.g., read-only memory ("ROM"), programmable ROM ("PROM"), erasable programmable ROM ("EPROM"), electrically erasable programmable ROM "EEPROM"), flash memory, etc.) coupled with the address/data bus 1102, wherein the non-volatile memory unit 1108 is configured to store static information and instructions for the processor 1104. Alternatively, the computer system 1100 may execute instructions retrieved from an online data storage unit such as in "Cloud" computing. In an aspect, the computer system 1100 also may include one or more interfaces, such as an interface 11110, coupled with the address/data bus 1102. The one or more interfaces are configured to enable the computer system 1100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 1100 may include an input device 1112 coupled with the address/data bus 1102, wherein the input device 1112 is configured to communicate information and command selections to the processor 1100. In accordance with one aspect, the input device 1112 is an alphanumeric input device, such as a keyboard, that may include alphanumeric and/or function keys. Alternatively, the input device 1112 may be an input device other than an alphanumeric input device. In an aspect, the computer system 1100 may include a cursor control device 1114 coupled with the address/data bus 1102, wherein the cursor control device 1114 is configured to communicate user input information and/or command selections to the processor 1100. In an aspect, the cursor control device 1114 is implemented using a device such as a mouse, a track-ball, a track-pad, an optical tracking device, or a touch screen. The foregoing notwithstanding, in an aspect, the cursor control device 1114 is directed and/or activated via input from the input device 1112, such as in response to the use of special keys and key sequence commands associated with the input device 1112. In an alternative aspect, the cursor control device 1114 is configured to be directed or guided by voice commands.

In an aspect, the computer system 1100 further may include one or more optional computer usable data storage devices, such as a storage device 1116, coupled with the address/data bus 1102. The storage device 1116 is configured to store information and/or computer executable instructions. In one aspect, the storage device 1116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 1118 is coupled with the address/data bus 1102, wherein the display device 1118 is configured to display video and/or graphics. In an aspect, the display device 1118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 1100 presented herein is an example computing environment in accordance with an aspect. However, the non-limiting example of the computer system 1100 is not strictly limited to being a computer system. For example, an aspect provides that the computer system 1100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 12:
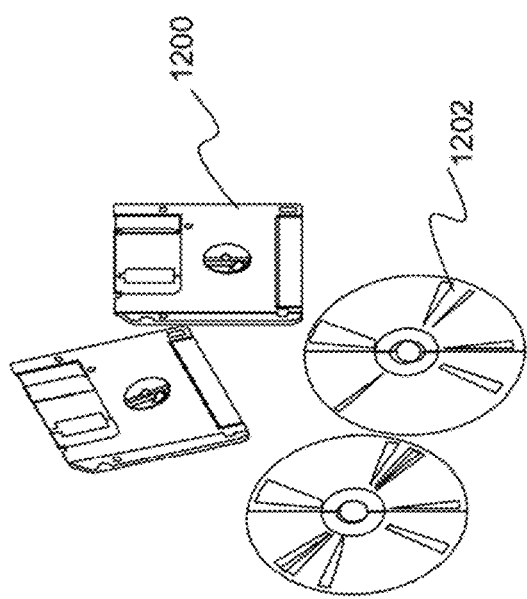
FIG. 12 is an illustration of a computer program product embodying an aspect of the present invention.

An illustrative diagram of a computer program product (i.e., storage device) embodying the present invention is depicted in FIG. 12. The computer program product is depicted as floppy disk 1200 or an optical disk 1202 such as a CD or DVD. However, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instructions" include computer program code (source or object code) and "hard-coded" electronics (i.e. computer operations coded into a computer chip). The "instruction" may be stored in the memory of a computer or on a computer-readable medium such as a floppy disk, a CD-ROM, and a flash drive. In either event, the instructions are encoded on a non-transitory computer-readable medium.

What is claimed is:

1. A system for adaptive three-dimensional (3D) to two-dimensional (2D) projection for different height slices and extraction of morphological image features, comprising:
   one or more processors and a memory, the memory having instructions encoded thereon, such that upon execution of the instructions, the one or more processors perform operations of:
   receiving the 3D point cloud data;
   selecting an image pixel number to point cloud number ratio;
   determining image row and image column numbers for desired height slices; and
   accumulating the 3D point cloud on the desired height slices to generate a plurality of 2D height slices.

2. The system as set forth in claim 1, wherein in accumulating the 3D point cloud on the desired height slices, the desired height slices are a number of horizontal slices that divide the 3D point cloud in a vertical direction, with the 3D point clouds being accumulated into different height slices depending on height (z-axis) positions, as follows:

$$z\text{-span equals max-}z\text{ minus min-}z,$$

where max z is a maximum measurement of the 3D point cloud in the z-axis and min z is a minimum measurement of the 3D point cloud in the z-axis, and $$z\text{-interval equals }z\text{-span divided by height slice number,}$$

where z-interval is a thickness of each height slice.

3. The system as set forth in claim 2, wherein in accumulating the 3D point cloud on the desired height slices, the 3D point cloud includes point cloud points, with the point cloud points being accumulated in each height slice such that if there is one or more than one points accumulated on a pixel, then a pixel value is one, otherwise the pixel value is zero.

4. The system as set forth in claim 2, wherein in accumulating the 3D point cloud on the desired height slices, the 3D point cloud includes point cloud points, with the point cloud points being accumulated in each height slice such that if there is one or more than one points accumulated on a pixel, then a pixel value equals to total accumulated point numbers, otherwise the pixel value is zero.

5. The system as set forth in claim 2, wherein in accumulating the 3D point cloud on the desired height slices, the 3D point cloud includes point cloud points, with the point cloud points being accumulated in each height slice such that if there is one or more than one points accumulated on a pixel, then a pixel value equals to a sum of an intensity from each of the accumulated points, otherwise the pixel value is zero.

6. A computer program product for adaptive three-dimensional (3D) to two-dimensional (2D) projection for different height slices and extraction of morphological features, comprising:
computer-readable instructions stored on a non-transitory computer-readable medium that are executable by a computer having a processor, such that upon execution by the processor, the computer performs operations of:
receiving 3D point cloud data;
selecting an image pixel number to point cloud number ratio;
determining image row and image column numbers for desired height slices; and
accumulating the 3D point cloud on the desired height slices to generate a plurality of 2D height slices.

7. The computer program product as set forth in claim 6, wherein in accumulating the 3D point cloud on the desired height slices, the desired height slices are a number of horizontal slices that divide the 3D point cloud in a vertical direction, with the 3D point clouds being accumulated into different height slices depending on height (z-axis) positions, as follows:

$$z\text{-span equals max-}z \text{ minus min-}z,$$

where max z is a maximum measurement of the 3D point cloud in the z-axis and min z is a minimum measurement of the 3D point cloud in the z-axis, and $$z\text{-interval equals }z\text{-span divided by height slice number,}$$

where z-interval is a thickness of each height slice.

8. The computer program product as set forth in claim 7, wherein in accumulating the 3D point cloud on the desired height slices, the 3D point cloud includes point cloud points, with the point cloud points being accumulated in each height slice such that if there is one or more than one points accumulated on a pixel, then a pixel value is one, otherwise the pixel value is zero.

9. The computer program product as set forth in claim 7, wherein in accumulating the 3D point cloud on the desired height slices, the 3D point cloud includes point cloud points, with the point cloud points being accumulated in each height slice such that if there is one or more than one points accumulated on a pixel, then a pixel value equals to total accumulated point numbers, otherwise the pixel value is zero.

10. The computer program product as set forth in claim 7, wherein in accumulating the 3D point cloud on the desired height slices, the 3D point cloud includes point cloud points, with the point cloud points being accumulated in each height slice such that if there is one or more than one points accumulated on a pixel, then a pixel value equals to a sum of an intensity from each of the accumulated points, otherwise the pixel value is zero.

11. A computer implemented method for adaptive three-dimensional (3D) to two-dimensional (2D) projection for different height slices and extraction of morphological features, comprising:
causing one or more processors to execute instructions encoded on a non-transitory memory, such that upon execution of the instructions, the one or more processors performs operations of:
receiving 3D point cloud data;
selecting an image pixel number to point cloud number ratio;
determining image row and image column numbers for desired height slices; and
accumulating the 3D point cloud on the desired height slices to generate a plurality of 2D height slices.

12. The method as set forth in claim 11, wherein in accumulating the 3D point cloud on the desired height slices, the desired height slices are a number of horizontal slices that divide the 3D point cloud in a vertical direction, with the 3D point clouds being accumulated into different height slices depending on height (z-axis) positions, as follows:

$$z\text{-span equals max-}z \text{ minus min-}z,$$

where max z is a maximum measurement of the 3D point cloud in the z-axis and min z is a minimum measurement of the 3D point cloud in the z-axis, and $$z\text{-interval equals }z\text{-span divided by height slice number,}$$

where z-interval is a thickness of each height slice.

13. The method as set forth in claim 12, wherein in accumulating the 3D point cloud on the desired height slices, the 3D point cloud includes point cloud points, with the point cloud points being accumulated in each height slice such that if there is one or more than one points accumulated on a pixel, then a pixel value is one, otherwise the pixel value is zero.

14. The method as set forth in claim 12, wherein in accumulating the 3D point cloud on the desired height slices, the 3D point cloud includes point cloud points, with the point cloud points being accumulated in each height slice such that if there is one or more than one points accumulated on a pixel, then a pixel value equals to total accumulated point numbers, otherwise the pixel value is zero.

15. The method as set forth in claim 12, wherein in accumulating the 3D point cloud on the desired height slices, the 3D point cloud includes point cloud points, with the point cloud points being accumulated in each height slice such that if there is one or more than one points accumulated on a pixel, then a pixel value equals to a sum of an intensity from each of the accumulated points, otherwise the pixel value is zero.

* * * * *